Patented July 21, 1936

2,048,461

UNITED STATES PATENT OFFICE 2,048,461

AUTOMOBILE COVER

James H. Mosgoffian, New York, N. Y.

Application May 4, 1934, Serial No. 723,841

2 Claims. (Cl. 296—136)

The present invention relates to protective coverings, and more particularly to a cover for automobiles and the like.

When automobiles are placed in storage or are kept in a garage for a substantial period of time, it is desirable to cover them to protect the lacquer coating. Usually a sack-like cover or several sheets of covering material are used for this purpose. A difficulty with such covers is that the car cannot be driven while it is covered because air gets under the cover and rips it off and for various other reasons. They fit loosely about the car and do not prevent dust or dirt from accumulating on the car.

The present invention aims to overcome these difficulties by providing a simple inexpensive form-fitting automobile cover having transparent portions therein so that the automobile may be driven while the cover is applied thereto. The present invention further aims to improve the method of fastening the cover to the car so that the car may be driven at a substantial rate of speed while the cover is thereon.

An object of the present invention is to provide a simple inexpensive vehicle cover which is readily applied and removed.

Another object of the invention is to provide a form-fitting cover adapted to be securely fastened to an automobile so that the automobile may be driven while the cover is on.

Another object of the invention is to provide a cover which is suitable for storage purposes and also affords protection against inclement weather while the car is driven or parked.

Another object of the invention is to provide a cover having suitable openings which may be readily opened and closed for permitting access to the interior of the car.

Another object of the invention is to provide a cover having portions adapted to be opened to facilitate operation of the vehicle while the cover is applied thereto.

Another object of the invention is to provide a cover for an automobile adapted to be cleaned or washed while applied to the automobile.

A further object of the invention is to provide a covering device having transparent members therein adapted to cover the windows of the car.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a side elevational view illustrating a preferred embodiment of the invention;

Fig. 2 is a front elevational view of the preferred embodiment;

Fig. 3 is an enlarged fragmentary elevational view, partly in section, showing a preferred device for closing the door flaps;

Fig. 4 is an enlarged fragmentary sectional view taken on the line 4—4 of Fig. 1;

Fig. 5 is an enlarged fragmentary sectional view taken on the line 5—5 of Fig. 1;

Fig. 6 is an enlarged fragmentary view of the lower edge of the cover;

Fig. 7 is an enlarged fragmentary sectional view illustrating another way of fastening the cover; and Fig. 8 is a side elevational view, partly in section, illustrating a preferred cover for the lamps of a vehicle.

Figure 1:
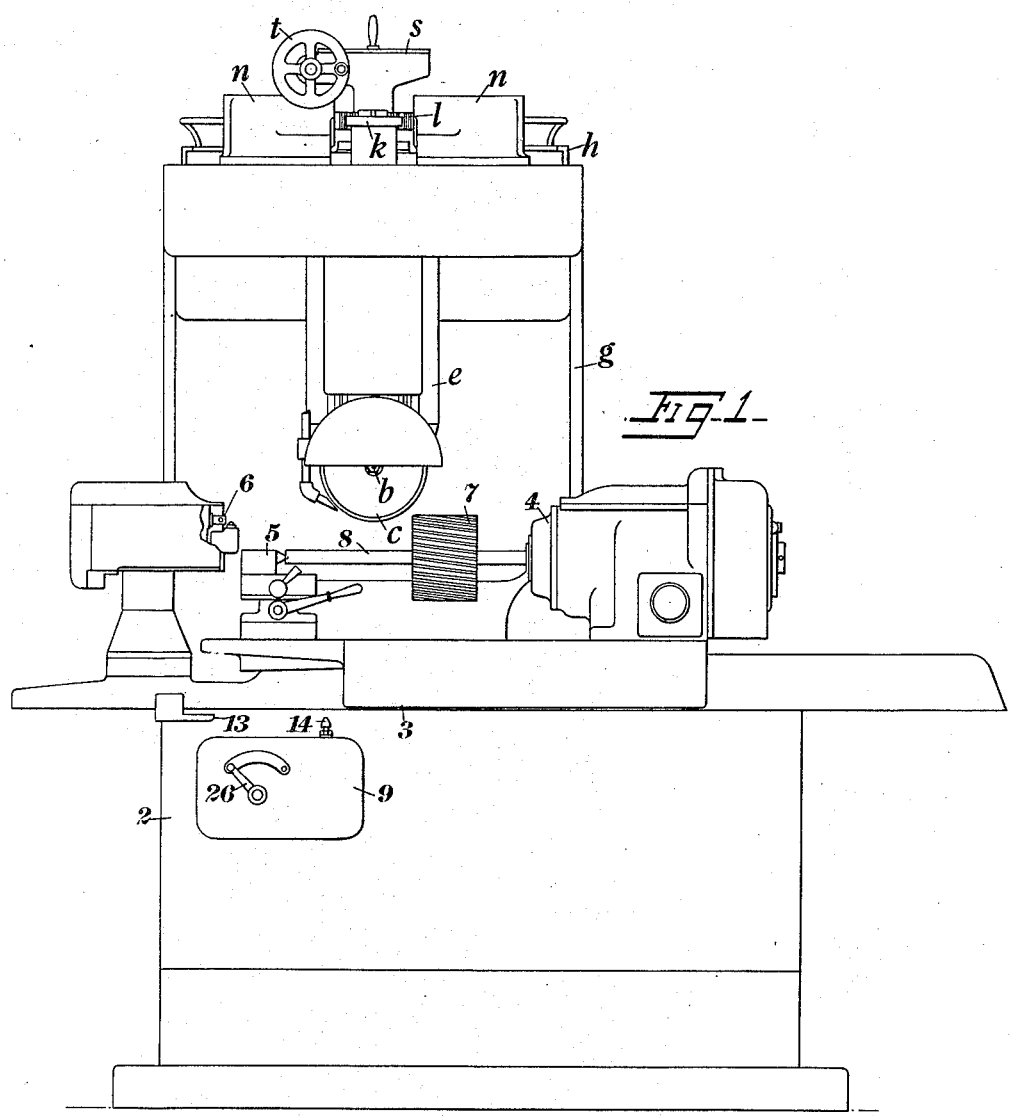

Referring again to the drawing, and more particularly to Figs. 1 to 6, there is shown a cover 1 adapted to fit over an automobile, herein shown as a sedan. Preferably, the cover is made of waterproof material such as canvas or chemically treated cloth. The material preferably is smooth and soft so that it does not mar the lacquer coating on the car and is substantially flexible to facilitate folding the cover together when it is packed away.

The cover shown herein may be made of strips of material sewed together to provide a one-piece cover adapted to enclose the body, hood and fenders of the car. To accomplish this, the cover comprises to top portion 2 fitting over the top or roof of the car, side portions 4 extending along the sides of the body, a back portion 5 covering the back of the car and a sack-shaped portion 6 fitting over the hood. Suitable portions 7 and 9 are attached to the side portions 4 for covering, respectively, the rear fenders and the running board. The hood portion 6 has suitable portions 10 attached thereto adapted to cover the front fenders.

Preferably, the side parts 4 and the back portion 5 are provided with transparent members 11 at the windows of the car, and a similar transparent member 12 is provided for the windshield of the automobile. These transparent members may be made of material such as celluloid, Cellophane, or other related compositions, which are The car may then be stored or driven. The cover permits a person to drive a car safely and at the same time protects the paint, whether the car is being driven or parked. The cover is also desirable for persons who park their cars overnight in the open and also for persons who frequently drive along muddy roads. The cover is also suitable for driving through desert areas, where sand particles would scratch the paint. It will, of course, be understood that the cover shown herein applied to a sedan can be made to fit other types of automobiles.

The cover is adapted to be cleaned conveniently and inexpensively. Preferably this is done while it is on the car. It may be brushed vigorously, or if desired may be washed by spraying with water. This method of cleaning can be carried out without getting the dirt or water under the cover because the cover is water tight and preferably no open slits in the body where water can get through. The fasteners 20 close the door flaps and the weather strips 22 form a substantially tight seal.

It will be seen that the present invention provides a simple inexpensive, serviceable automobile cover adapted to be used in all kinds of weather. It may be used while driving and for storing or parking purposes. It is adapted to be cleaned quickly and conveniently and can be folded together when not in use. The cover can be quickly applied and removed in a practical manner. The covers are rugged in construction and can readily withstand any rough usage to which they may be subjected.

As various changes may be made in the form, construction and arrangement of parts, without departing from the spirit and scope of the invention and without sacrificing its advantages, it is to be understood that all matter herein is to be interpreted as illustrative and not in a limiting sense.

Having thus described my invention, I claim:

1. In combination with an automobile having a body, a hood and fenders, a unitary form fitting vehicle cover for an automobile of the sedan type having flaps adjacent the doors of the automobile provided by slits extending along the upper, lower and side edges of the doors, each of said flaps having an opening therein for extending the handles of the doors therethrough and having spaced fasteners for attaching said flaps to the doors, whereby said flaps are movable with said doors, interengaging fasteners along the upper, lower and side edges of the flaps for closing the slits, a strip of material adjacent said fasteners for preventing contact of said fasteners against the body of the automobile, form fitting portions for encasing the fenders of the automobile, the fenders having stationary pins concealed at the underside thereof and the edges of said fender portions being folded beneath the rim of the fenders, and snap buttons at the lower edges of the fender portions for removably engaging the pins on the fenders.

2. In combination with an automobile having a body, a hood and fenders, a unitary form fitting vehicle cover for an automobile of the sedan type having flaps adjacent the doors of the automobile provided by slits extending along the upper, lower and side edges of the doors, each of said flaps having an opening therein for extending the handles of the doors therethrough and having spaced fasteners for attaching said flaps to the doors, whereby said flaps are movable with said doors, interengaging fasteners along the upper, lower and side edges of the flaps for closing the slits, a strip of material adjacent said fasteners for preventing contact of said fasteners against the body of the automobile, form fitting portions for encasing the fenders of the automobile, the fenders having stationary pins concealed at the underside thereof and the edges of said fender portions being folded beneath the rim of the fenders, snap buttons at the lower edges of the fender portion for removably engaging the pins on the fenders, a flap adjacent the radiator of the automobile, a flap at each side of the hood of said automobile provided by a slit extending along the bottom and side edges of the flap, and interengaging fasteners along the bottom and side edges of said last flap for closing the slit.

JAMES H. MOSGOFFIAN.

July 21, 1936.   A. H. ORCUTT   2,048,462
MACHINE FOR GRINDING GEAR WHEELS
Filed Oct. 23, 1935   5 Sheets—Sheet 1

A. H. Orcutt
INVENTOR

By: Glascock Downing & Seebold
Attys.